United States Patent [19]

Piatt et al.

[11] Patent Number: 4,494,124

[45] Date of Patent: Jan. 15, 1985

[54] INK JET PRINTER

[75] Inventors: Michael J. Piatt, Englewood; Theodore F. Williams, Beavercreek, both of Ohio

[73] Assignee: Eastman Kodak Company, Rochester, N.Y.

[21] Appl. No.: 528,481

[22] Filed: Sep. 1, 1983

[51] Int. Cl.³ .......... G01D 15/18

[52] U.S. Cl. .......... 346/1.1; 346/75

[58] Field of Search .......... 346/75, 1.1, 140 R

[56] References Cited

U.S. PATENT DOCUMENTS

| | | | |
|---|---|---|---|
| 3,661,304 | 5/1972 | Martinez et al. | 222/394 |
| 3,761,953 | 9/1973 | Helgeson et al. | 346/75 |
| 3,974,508 | 8/1976 | Blumenthal | 346/140 R |
| 4,038,667 | 7/1977 | Hou et al. | 346/140 R |
| 4,042,937 | 8/1977 | Perry et al. | 346/1 |
| 4,240,082 | 12/1980 | Yu | 346/75 |
| 4,314,264 | 2/1982 | Bok et al. | 346/140 R |
| 4,318,114 | 3/1982 | Huliba | 346/140 R |
| 4,336,547 | 6/1982 | Matsumoto et al. | 346/75 |
| 4,399,446 | 8/1983 | McCann et al. | 346/140 R |
| 4,422,080 | 12/1983 | Titcomb | 346/1.1 |

*Primary Examiner*—E. A. Goldberg
*Assistant Examiner*—Gerald E. Preston
*Attorney, Agent, or Firm*—Biebel, French & Nauman

[57] ABSTRACT

An ink jet printer having an ink supply tank and a constant volume fluid pump which pumps ink through a supply line to a print head and, during a start up sequence, to a pressurizing line having a fluid accumulator which rapidly increases the line pressure of the system until a predetermined ink pressure within the print head is reached. The pressure is sensed by a transducer adjacent the print head, and an outlet valve is actuated to close the flow of ink through the head abruptly, thereby creating a pressure wave which initiates ink flow through the orifices of the print head. In order to minimize contamination of ink in the supply line, the pressurizing line conveys ink back to the supply tank. The printer also includes an air system having a constant volume vacuum pump which is connected to draw air from the ink supply tank, thereby creating a vacuum within the tank, a pair of inlet lines connected to the vacuum pump inlet, each having a valve thereof which can be opened or closed to vary the amount of vacuum created within the tank by the supply pump, and an ink removal line which is connected to the ink supply line such that atmospheric air is drawn through the ink removal line, ink supply line and print head to the ink supply tank, thereby purging the print head of ink.

24 Claims, 4 Drawing Figures

INK JET PRINTER

BACKGROUND OF THE INVENTION

The present invention relates to ink jet printers and, more particularly, to ink jet printers utilizing constant volume pumps for supplying ink and regulating the pressure within the ink supply tank.

A typical ink jet printer comprises a print head or image bar having a fluid reservoir and an orifice plate having a plurality of orifices formed therein through which ink flows from the reservoir to impinge upon a medium such as paper. The print head also includes a stimulator for creating mechanical disturbances within the reservoir to effect an orderly break-up of fluid streams from the orifices into fluid droplets. The droplets are selectively charged by electrodes positioned adjacent to the outlets of the orifices, and charged droplets are deflected by deflection fields into catchers which convey the ink back to a supply tank.

The reservoir of the print head is supplied ink from an ink supply tank through a supply line. A pump, connected to the supply line, conveys ink from the tank under pressure to the reservoir. A return line extends from the print head back to the supply tank and includes an outlet valve which is selectively actuated to close the line, or to open it and allow the vacuum within the supply tank to draw ink from the reservoir.

When this system is started up, the pump requires a certain amount of time to pump fluid to the reservoir to create a pressure within the reservoir sufficient to generate fluid streams intense enough to form ink droplets. Prior to the time this pressure is reached, however, the ink will weep through the orifices and may foul the charge plates as well as the environment of the printer surrounding the print head. Numerous systems have been developed to effect an extremely rapid pressure rise within the print head reservoir, thereby minimizing the amount of ink seepage through the orifices at start-up. For example, in Bok et al. U.S. Pat. No. 4,314,264 and in Huliba U.S. Pat. No. 4,318,114, there is disclosed an ink jet printer having a print head communicating with an ink supply line and an ink return line which in turn are connected to a supply tank. A pump on the ink supply line pumps ink from the supply tank to the print head. A solenoid actuated valve is located on the ink return line immediately downstream of the print head.

The ink supply line is connected to a plurality of ink recirculating lines which convey ink from a location downstream of the ink pump to a location upstream of the pump, so that a portion of the ink leaving the pump is returned to the pump inlet, while the remainder flows to the print head. Each of the recirculating lines includes a restriction which creates a different impedance for that line. A valve system is actuated by solenoids such that a selected one of the recirculating lines may be opened at one time.

In operation, the ink supply pump is actuated, pumping ink to the print head and to a selected one of the recirculating lines. The flow rate of ink through the print head at this stage is relatively low and is insufficient to initiate streams of ink droplets through the orifice plate of the print head. Subsequently, the valve system on the ink recirculating line is actuated to divert ink flow through a recirculating line having a higher impedance, thereby reducing the amount of ink recirculating through the line, and increasing the flow of ink through the print head. At this time, the outlet valve adjacent the print head is closed, thereby creating a sudden pressure impulse which travels upstream to the ink in the print head, producing a rapid flow of ink through the orifice plate of the print head and the establishment of the desired jet drop streams. Once the streams of ink drops have been established, the ink flow is diverted through another ink recirculating line to reduce the flow rate through the print head to the optimal flow rate for ink jet printing.

Another method of rapidly increasing the pressure within the print head is disclosed in the McCann et al. U.S. patent application Ser. No. 340,136, filed Jan. 18, 1982, and commonly assigned. That application discloses an ink jet printing system in which an ink pump pumps ink from a supply tank through a supply line to a print head and through a line to an accumulator which is also connected to the print head supply line. As the pump is operated, ink flows to the print head and to the accumulator, where the ink pressure increases with time. The increase in pressure within the accumulator in turn increases the ink pressure within the supply line and print head to a level appropriate for the production of jet drop streams by the orifice plate. Once this pressure level is reached, an outlet valve on a return line from the print head to the supply tank is closed, thereby creating a pressure wave which initiates the production of jet drop streams.

In order to determine the exact time at which the ink pressure within the print head is sufficient to initiate production of jet drop streams, and hence the appropriate time to close the outlet valve, the ink jet printer includes a pressure transducer within the accumulator which is operatively connected to a computer which actuates the solenoid of the outlet valve. However, in order to effect an accurate detemination of the pressure within the print head, it is necessary to eliminate any item from the section of ink supply line extending between the accumulator and print head, such as a filter, which may create a pressure gradient in the line. Accordingly, any contaminants which may enter the ink supply system in the accumulator would travel through the ink supply line to the print head, and perhaps increase the frequency of orifice clogging.

Another method of controlling the ink pressure within a print head is to regulate the pressure within an ink supply tank which is connected to the outlet of a print head by an ink return line. By reducing the gas pressure within the supply tank, a partial vaccum is created within the ink return line, thereby increasing the rate of ink flow from the print head to the supply tank and reducing the amount of ink seepage through the orifice plate.

For example, in the Yu U.S. Pat. No. 4,240,082, there is disclosed a shut down system for an ink jet recorder in which a print head is connected to a supply of ink by an ink supply line having an inlet solenoid, and is connected to a source of vacuum by an outlet line having an outlet valve. A pressure sensing transducer is positioned within the print head to monitor the ink pressure therein. To effect shut down, the inlet valve is closed, thereby stopping the flow of ink to the print head and permitting the fluid pressure therein to drop to a point where the ink jet streams are on the verge of deviating from a desired linear path. At this point, the outlet valve is opened, thereby connecting the print head to a vacuum source which sucks the ink from the head and rapidly reduces the pressure within the head below that at which ink leaves the orifices. Thus, the amount of ink seepage during shut down is minimized.

Accordingly, there is a need for an ink jet printer of a simple yet reliable design, capable of effecting a rapid pressure increase within the print head during start up periods, and a rapid draining of ink from the print head during shut down, thereby minimizing the seepage and splattering of ink during these periods. Furthermore, such an ink jet system should be constructed to provide filtered ink to the print head in order to minimize contamination and clogging of the orifice plate.

SUMMARY OF THE INVENTION

The present invention provides an ink jet printer which utilizes an accumulator to effect a rapid increase in ink pressure within the print head, yet effectively eliminates the possibility of the print head becoming contaminated by effluent from the accumulator. The printer also provides a rapid decrease in ink pressure within the print head during shut down to minimize weeping and splattering of ink through the orifices. Furthermore, the printer is capable of creating a relatively high vacuum in the supply tank which increases the suction of the catchers adjacent the print head at periods during start up and shut down during which ink splattering is likely to occur.

The present invention is an ink jet printer having a print head with a reservoir and orifice plate, an ink supply tank and an ink pump having an inlet for receiving ink from the supply tank, and an outlet for delivering ink under pressure to the print head through a supply line. The printer includes a first ink recirculating line for providing a flow of ink from the pump outlet to the supply tank and having a fluid restriction thereon, a second ink recirculating line for providing a flow of ink from the pump outlet to the pump inlet, and a valve which is selectively controllable to direct ink from the pump outlet through either the first or second recirculating lines.

The first ink recirculating line includes an accumulator positioned thereon between the flow restriction and the pump outlet for receiving ink from the pump outlet during operation, thereby creating a back pressure in the first ink recirculating line upstream of the restriction which increases with time. A control means controls the first valve to direct ink from the pump outlet through the second ink recirculating line, whereby ink pressure in the reservoir and supply line remain substantially constant, or to direct ink from the pump outlet through the first ink recirculating line, whereby the flow restriction and the accumulator cause the ink pressure in the reservoir and the print head supply line to increase with time until a pressure in the print head reservoir sufficient to initiate jet drop streams is reached.

The ink jet printer also includes a return line for providing a flow of ink from the reservoir to the supply tank and a second valve on the return line for selectively opening and closing the line. The control means includes a transducer for sensing ink pressure within the reservoir of the print head and means for actuating the second valve.

A third ink recirculating line is connected to the ink supply line to the print head and provides a flow of ink from the print head supply line to the pump inlet. A third valve is positioned to selectively direct a flow of ink from the pump outlet through either the print head supply line, whereby ink is supplied to the reservoir of the print head, or through the third recirculating line, whereby the ink is directed to the pump inlet.

The invention also includes an air supply and vacuum system which includes a vacuum pump having an inlet connected to a vacuum line to draw air from the ink supply tank, and an outlet to the atmosphere which is opened and closed by a first air valve. The inlet to the vacuum pump is also connected to first and second air supply lines, oriented in parallel, which supply atmospheric air to the pump inlet. The air supply lines each have a valve thereon which may be actuated to open and close the line. The second air supply line includes a restriction so that air flow therethrough is at a rate which is lower than air flow through the first supply line. Thus, by selectively opening one or the other, or both, of the valves on the air supply lines, the amount of air supplied to the vacuum pump from the atmosphere is varied, with the result that the amount of air withdrawn from the supply tank, and hence the tank vacuum, is selectively varied.

An air purge line is connected to the ink supply line upstream of the print head and provides a supply of atmospheric air to the print head. During a purging step, the vacuum pump is actuated to evacuate air from the ink supply tank, thereby drawing air through the air purge line, the ink supply line, print head and to the supply tank, thereby removing liquid ink from the print head.

The inclusion of the parallel air supply lines in the air supply portion of the ink jet printer, and the inclusion of the ink recirculating lines in the ink supply system allow the use of a vacuum pump and fluid pump which are of the constant volume type, yet provide for predetermined levels of ink pressures in the print head and predetermined vacuum pressures in the ink supply tank.

Accordingly, it is an object of the present invention to provide an ink jet printer having an ink supply system which effects a rapid increase in ink pressure within the print head, thereby minimizing the leakage of ink prior to start up; and an air supply system which effects a relatively high vacuum within the supply tank to effect rapid evacuation of ink from the print head during shut down, as well as a purging of the ink from the print head prior to start up; and an ink jet printer which utilizes constant volume pumps in a relatively uncomplicated system with relatively few components, when compared with prior art devices having similar capabilities.

Other objects and advantages of the invention will be apparent from the following description, the accompanying drawings and the appended claims.

DESCRIPTION OF THE PREFERRED EMBODIMENT

Figure 1:
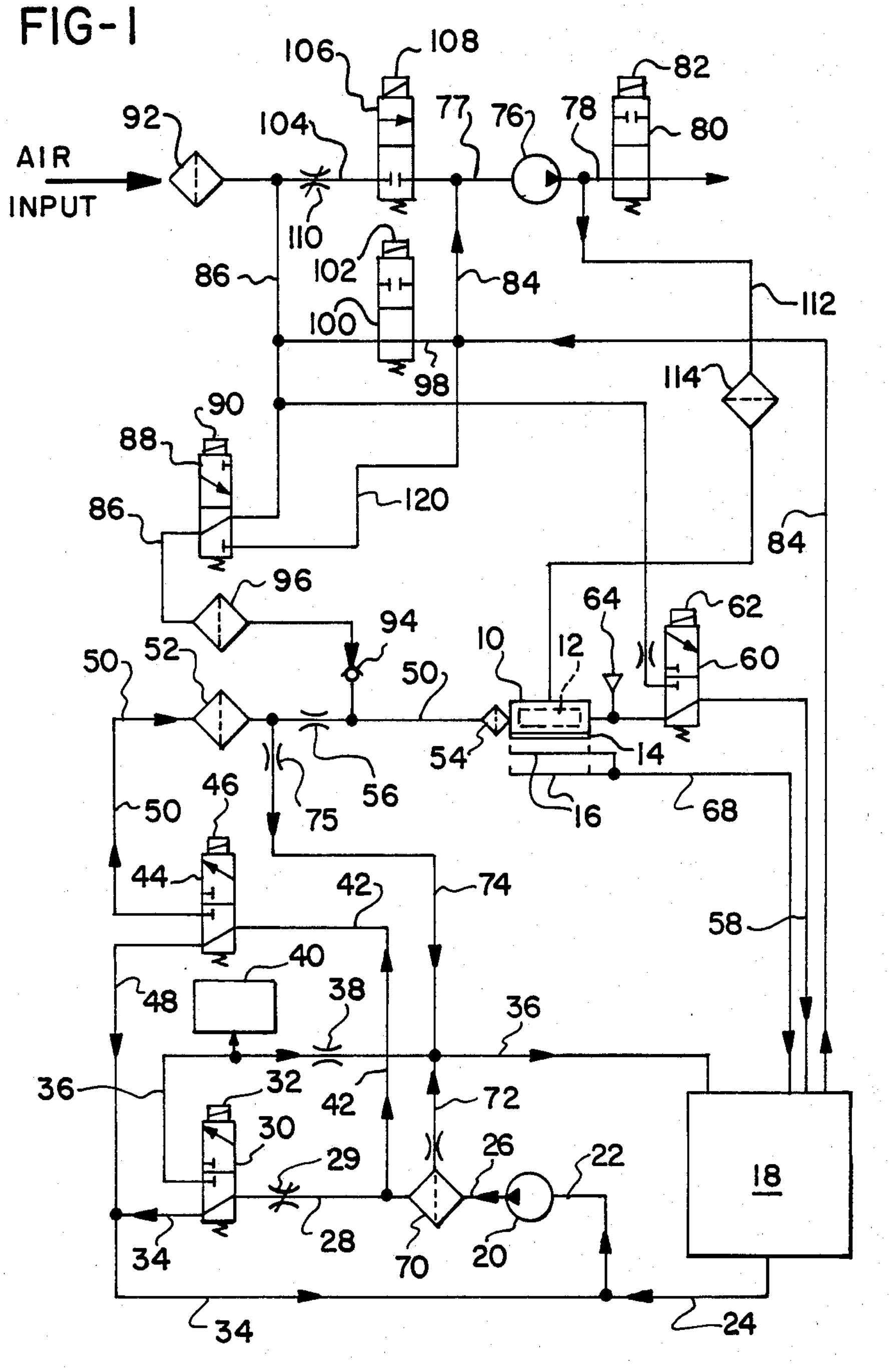
FIG. 1 is a schematic diagram of a preferred embodiment of the present invention.

As shown in FIG. 1, the ink jet printer of the preferred embodiment includes a print head, generally designated 10, which is of a well-known design, such as shown in Brady et al. U.S. Pat. No. 3,805,273, the disclosure of which is incorporated herein by reference.

Print heat 10 includes a fluid receiving reservoir 12 and an orifice plate 14 having a plurality of orifices (not shown) communicating with the reservoir for providing ink flow therethrough to produce a plurality of jet drop streams of ink for deposit upon a print receiving medium. Drops which are not to be deposited upon the print receiving medium are selectively charged by charging electrodes and electrically deflected by one or more deflection fields to one or more drop catchers 16 for reuse by the printer.

INK SUPPLY SYSTEM

The printer has an ink supply system which includes an ink supply tank 18 for storing a quantity of ink therein and pump means such as a constant volume ink pump 20. Pump 20 includes an inlet 22 which is connected to tank outlet 24, and a pump outlet 26 connected to line 28, which includes a variable restrictor 29 thereon so that the output of the ink pump through line 28 may be set at a predetermined rate. Line 28 terminates at valve 30, actuated by solenoid 32, which displaces the valve to supply ink flow from line 28 to either ink recirculating line 34 or ink pressurizing line 36.

Ink recirculating line 34 is connected to direct ink from the line 28 to the pump inlet 22. Ink pressurizing line 36 is connected to the ink tank 18 and includes a fluid restrictor 38 thereon, and a fluid accumulator 40, positioned upstream of the restrictor 38.

Line 42 is connected to line 28 and extends to valve 44 which is actuated by a solenoid 46. Valve 44 is actuated to direct ink flow either to ink recirculation line 48, which is connected to ink recirculating line 34, or to print head supply line 50. Print head supply line 50 extends from valve 44 to the print head 10 and includes a filter 52 and a filter 54 which is positioned immediately upstream of the reservoir 12. A fluid restrictor 56 is positioned on supply line 50 between filters 52 and 54. Thus, line 42, valve 44, line 48, recirculating line 34, and print head supply line 50 comprise a print head supply means which selectively provides a flow of ink from the pump outlet 26 either to the reservoir 12 or to the pump inlet 22.

Figure 2:
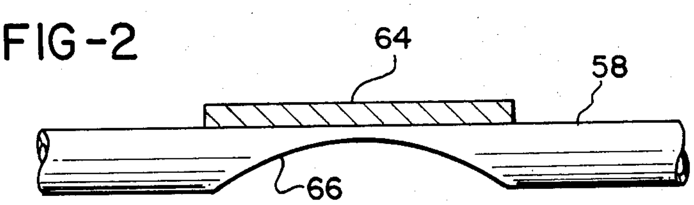
FIG. 2 is a somewhat schematic detail of a top view of the transducer and adjacent segment of the return line of the ink jet printer of FIG. 1.
Figure 3:
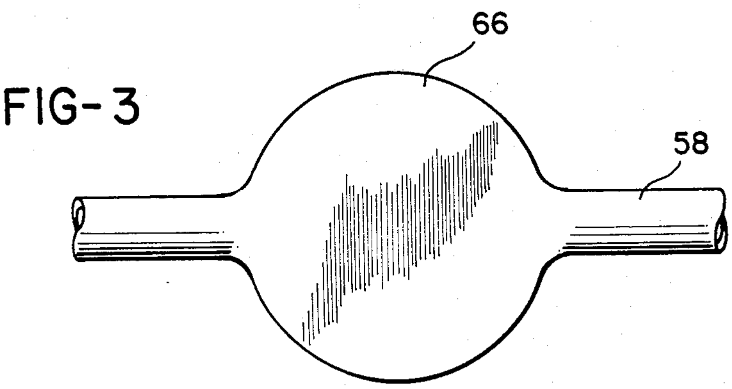
FIG. 3 is a side view of the detail of FIG. 2.

An ink return line 58 extends from the reservoir 12 to the ink tank 18, and includes valve 60, actuated by solenoid 62. A pressure transducer 64, also shown in FIGS. 2 and 3, is attached to ink return line 58 at a location immediately downstream of the print head 10. Transducer 64 is a capacitive transducer and is of a type well-known in the art, as for example the Model P-612 manufactured by Kavlico Corp. of Chatsworth, Calif.

The transducer 64 is generally disk-shaped, and the section 66 of line 58 immediately adjacent the transducer is expanded to a correspondingly-sized circular shape. The section 66 is concave such that the cross-sectional area of the section is constant across the face of the transducer 64 and is equivalent to the cross-sectional area of the remainder of line 58. By providing a section 66 having a constant cross-sectional area, the velocity of ink through the section is constant, thus eliminating the possibility of air entrapment which would cause the transducer to obtain a false pressure reading and would tend to dampen the shock wave generated by valve 60 during start up.

Catchers 16 are connected to the supply tank 18 by catcher line 68, which preferably includes an on-off valve (not shown). A filter 70 is located on pump outlet 26 and includes a line 72 for bleeding trapped air collected in the filter to ink pressurizing line 36, where the air is conveyed to the supply tank 18. Similarly, line 74 extends from ink supply line 50 to pressurizing line 36 to convey air from filter 52 back to the supply tank 18, and includes restrictor 75. Restrictor 75 ensures that the ink pressure within line 74 is always below atmospheric.

AIR SUPPLY SYSTEM

The air supply system includes a constant volume vacuum pump 76 having an inlet 77 connected to receive air from the atmosphere, and an outlet 78 also exhausting into the atmosphere. Valve 80, controlled by solenoid 82, is located on pump outlet 78 to open and close the line with respect to the atmosphere.

A vacuum line 84 extends from the ink supply tank 18 to the vacuum pump inlet 77. An air purge line 86 is connected to ink supply line 50 at a point downstream of restrictor 56 and includes valve 88 actuated by solenoid 90. Air purge line 86 includes an air filter 92 at an inlet and a check valve 94 immediately upstream of the connection with ink supply line 50. A second air filter 96 is positioned on air purge line 86 between valve 88 and check valve 94.

A first air supply line 98 extends from air purge line 86 to vacuum line 84 and includes valve 100, actuated by solenoid 102, which opens and closes the line. A second air supply line 104 extends between air purge line 86 and pump inlet 77, and includes valve 106 thereon, actuated by solenoid 108. A restrictor 110 is positioned on line 104 to reduce the air flow therethrough when valve 106 is opened.

An air skirt line 112 extends from pump outlet 78 to an air skirt (not shown) within print head 10, and includes filter 114. Line 116 extends from purge line 86 to valve 60, and includes restrictor 118 thereon. Line 120 extends from vacuum line 84 to valve 88 and is connected thereto such that actuation of solenoid 90 connects line 120 with the portion of air purge line 86 downstream of the valve.

Figure 4:
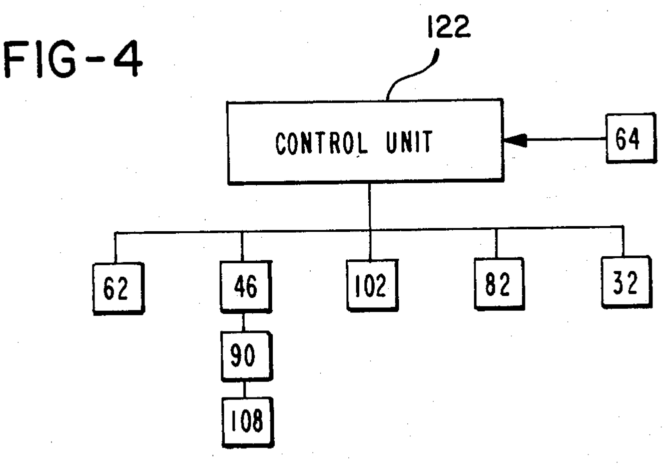
FIG. 4 is a schematic diagram of the control unit of the present invention.

As shown schematically in FIG. 4, the solenoids 32, 46, 62, 82, 90, 102 and 108 of the valves of the printer are selectively actuated by a control unit 122, which can be manually operated to initiate a start up or shut down sequence. As shown in FIG. 4, solenoids 46, 90 and 108 are always activated in unison. The control unit receives a signal from transducer 64 which is proportional to the pressure within the reservoir 12 of the print head 10. No other data input from the ink supply or air supply systems is required.

OPERATION

An operational cycle for the ink jet printer for the present invention is described in the following Table:

| Step | VALVE | | | | | |
|---|---|---|---|---|---|---|
| No. | (60) | (44,88,106) | (100) | (80) | (30) | DESCRIPTION |
| | | | START UP SEQUENCE | | | |
| 1 | 0 | 0 | 1 | 0 | 0 | Ink Removal |
| 2 | 0 | 0 | 0 | 1 | 0 | Charge Plate Clean |
| 3 | 0 | 1 | 0 | 0 | 0 | Stand By |
| 4 | 0 | 1 | 1 | 0 | 1 | Pre Start |
| 5 | 1 | 1 | 1 | 0 | 1 | Start Up |
| 6 | 1 | 1 | 1 | 0 | 0 | Bar On (High Vacuum) |
| 7 | 1 | 1 | 0 | 0 | 0 | Bar On (Print Pressure) |
| | | | SHUT DOWN SEQUENCE | | | |
| 8 | 1 | 1 | 1 | 0 | 0 | Bar On (High Vacuum) |
| 9 | 0 | 1 | 1 | 0 | 0 | Bar Off |

-continued

| Step | VALVE | | | | | |
|---|---|---|---|---|---|---|
| No. | (60) | (44,88,106) | (100) | (80) | (30) | DESCRIPTION |
| 10 | 0 | 1 | 0 | 0 | 0 | Stand By |
| 11 | 0 | 0 | 1 | 0 | 0 | Removal |
| 12 | 0 | 0 | 0 | 1 | 0 | Charge Plate Clean |
| 13 | 0 | 0 | 1 | 0 | 0 | Shutdown |

A "1" in the Table indicates that the solenoid associated with the valve is actuated, while a "0" indicates that the solenoid is not actuated.

Initially, as indicated in step 1, the system is actuated by the control unit 122 to initiate a start up sequence. In the first or ink removal step, valves 30 and 44 are not actuated so that the ink from pump outlet 26 is recirculated through recirculating lines 48 and 34 to the pump inlet 22, thus leaving print head supply line 50 closed to a source of ink. With regard to the air supply system, valves 100 and 106 on the air supply lines are both closed, so that the pump inlet 77 draws air only through vacuum line 84 from the ink supply tank 18, thus creating a minimum gas pressure level within the supply tank. At the same time, valve 88 is opened, thus permitting air to flow from the atmosphere to air purge line 86, through ink supply line 50 to the reservoir 12 of the print head 10. Valve 60 is open so that the relatively low pressure within the supply tank 18 draws air from the reservoir 12, through the ink return line 58 and to the tank, thereby drying and removing all liquid ink from the print head reservoir 12.

In step 2, the air supply system is actuated to clean ink particles from the charge plate and deflector ribbon adjacent the orifice plate 14 of the print head 10. Valve 100 is opened, thereby providing a source of relatively high pressure air to the pump inlet 77, and valve 80 is closed, thereby diverting the output of pump 76 through the clean air skirt line 112. The flow of air through line 112, which preferably is about 15 s.c.f.h. during the other steps of the system operation, is elevated to between 35 and 60 s.c.f.h. for step 2, thereby providing a blast of air which removes particles from the charge plates and deflection ribbon surrounding the orifice plate 14 of the print head 10.

In step 3, the printer is actuated to a stand by state which provides additional cleansing of the print head 10. Valves 100 and 106 are both opened, thereby providing a source of relatively high pressure air for the vacuum pump inlet 77, with a concomitant reduction of air flow through vacuum supply line 82 which raises the relatively low pressure of air within supply tank 18. Valve 44 is actuated to connect line 120 to air purge line 86, thereby connecting the air purge line with the pump inlet 76 which causes check valve 94 to close. The negative pressure (that is, below atmospheric pressure) within air purge line 86 maintains check valve 94 closed throughout the remainder of the start up sequence.

Valve 44 is actuated to direct ink flow from ink pump outlet 26, through line 42 to ink supply line 50, where it enters the reservoir of the print head 12. The ink flows through the reservoir 12 and back to the supply tank through return line 58 at a pressure below that sufficient to initiate jet drop flow through the orifice plate 14. The effect of this ink flow is to dissolve and remove dried ink particles from within the reservoir which may clog the orifice plate. Furthermore, the ink flow through the reservoir removes air bubbles which may form within the reservoir and conveys them to the supply tank 18.

As indicated in step 4, the system next enters a prestart phase in which the ink pressure within the print head is increased, while the vacuum within the supply tank 18 is increased to provide the catchers 16 with sufficient vacuum to remove ink splattering. Valve 100 is closed and valve 106 is opened to supply the vacuum pump 76 with a reduced amount of air at atmospheric pressure, thereby reducing the pressure within the supply tank 18 by drawing an increased amount of air through vacuum line 84. Valve 30 is actuated to divert ink flow from line 28 to ink pressurizing line 36 to charge accumulator 40. As accumulator 40 fills with ink, the air within the accumulator is compressed and raises the pressure of ink within the system downstream of pump outlet 26 and upstream of restrictor 38.

Thus, the pressure of the ink flowing through line 42, ink supply line 50 and reservoir 12 increases. It is at this time that the valve (not shown) on catcher line 68 is opened, thereby activating the catchers 16. The ink pressure within the reservoir, which in step 3 had been slightly below atmospheric, now rises to a level which is at or slightly above atmospheric pressure. At this time, transducer 64 senses the pressure level within the reservoir at which no air is drawn inwardly through the orifice plate 14 and no ink weeps outwardly through the orifice plate.

Step 5 is initiated at which time the printer is actuated to begin a flow of ink through the orifice plate 14. The valve 60 is closed abruptly, thereby creating a pressure wave which travels upstream through the reservoir 12 and ink supply line 50 to restrictor 56. The pressure wave is sufficient to initiate a substantially instantaneous flow of ink drops through the orifice plate 14, which are caught by catchers 16 and removed to the supply tank 18. The restrictor 56 is necessary in that it prevents the shock wave from dissipating as a result of encountering the relatively large cross-sectional area of filter 52. Actuation of valve 60 is facilitated by line 116, which provides a supply of air to the valve. In addition, line 116 allows ink to be drained from valve 60 to the supply tank 18.

Step 6 is initiated almost immediately after the start up of step 5. In step 6, valve 30 is actuated to divert ink flow from the pressurizing line 36 to the ink recirculating line 34. There is still a relatively low pressure within the supply tank 18, so that the catchers can remove any excess ink particles generated. The system remains in the configuration of step 6 until the pressure within the print head 10 drops to an operational level.

In step 7, the valve 100 is opened, thereby reducing the draw of air through vacuum line 84 and raising the pressure within the supply tank 18. The pressure within the supply tank 18 is now at the optimum level for the catchers 16 during a printing operation.

Step 8 initiates the shut down sequence, and is identical to step 6. Valve 100 is closed, thereby increasing the vacuum within the supply tank 18. In step 9, the system is actuated to a configuration identical to the start up configuration of step 5. Valve 60 is actuated to allow ink flow through return line 58, thereby reducing the pressure of ink within the reservoir 12 below that necessary to generate ink drops. The increased vacuum within the supply tank 18 effects a rapid reduction of pressure within the reservoir, thereby minimizing the "weeping" of ink through the orifice plate 14 at low pressures. At the same time, the high vacuum within the supply tank causes the catchers to catch and remove any undesirable ink particles generated during this step.

In step 10, the valve 100 is opened, thereby reducing the vacuum within the supply tank 18 resulting in a reduction of the ink flow through the reservoir 12. In step 11, valve 44 is actuated to divert ink flow from ink supply line 50 to recirculating line 48, thereby depriving the print head 10 of ink. Valve 88 is actuated so that air from line 86 purges the print head 10 of ink, which is drawn into the supply tank 18. In step 12, the valve 80 is again closed temporarily to divert a high pressure stream of air through the air skirt line 112 to dry and remove ink particles from the charge plate and deflection ribbon.

In step 13, the final step in the shut down sequence, the system is again actuated to the configuration of steps 1 and 11, and the ink and air pumps 20 and 76 are shut down.

From the foregoing description of the start up and shut down sequence of the printer of the present invention, it is apparent that the valves 100 and 106 cooperate with the constant volume vacuum pump 76 to provide four different vacuum levels within the ink supply tank 18. A relatively high vacuum is effected during the ink removal periods of steps 1, 11, and 13, during which both valves 106 and 100 are closed. A somewhat reduced vacuum is effected when valve 106 is opened, thereby providing air flow from the atmosphere to the pump inlet 76. This reduced vacuum is effected during the prestart, start up and high vacuum operations of steps 4–6, as well as steps 8 and 9.

The vacuum within the supply tank 18 is reduced further when valve 100 is opened and valve 106 is closed, thereby allowing first air supply line 98, which effects a greater air flow than second air supply line 104, to supply air to pump inlet 77. This amount of vacuum is optimal for the charge plate cleaning steps 2 and 12. When both valves 100 and 106 are opened, a maximum amount of atmospheric air is supplied to pump inlet 77, resulting in the lowest amount of vacuum (that is, the highest pressure) within the supply tank 18. This pressure level is optimal for the print pressure of step 7, and for stand by steps 3 and 10.

The capability of the system to adjust the tank vacuum to the appropriate level complements the pressurizing mechanism, which comprises the pressurizing line 36, restrictor 38 and accumulator 40, in that the ink pressure can be rapidly increased within the reservoir 12 during start up, or the ink can be rapidly evacuated from the reservoir during shut down.

While the form of apparatus herein described constitutes a preferred embodiment of this invention, it is to be understood that the invention is not limited to this precise form of apparatus, and that changes may be made therein without departing from the scope of the invention.

What is claimed is:

1. An ink jet printer, comprising:

a print head having a fluid receiving reservoir and an orifice plate with at least one orifice communicating with said reservoir for providing ink flow therethrough to form a jet drop stream;

a source of ink;

pump means having an inlet for receiving ink from said source and an outlet for delivering ink under pressure;

print head supply means for selectively providing a flow of ink from said pump outlet either to said reservoir or to said pump inlet;

print head pressurizing line for providing a flow of ink from said pump outlet to said ink source, said pressurizing line having means thereon for restricting ink flow therethrough and accumulator means, located between said pump outlet and said restricting means, for receiving ink from said pump outlet and creating an increase in pressure in said print head supply means and said print head;

valve means for selectively diverting ink from said pump outlet either to said print head pressurizing line or to said pump inlet; and control means for actuating said valve means to divert ink to said print head pressurizing line until a predetermined ink pressure is reached in said reservoir, then actuating said valve means to divert ink flow from said print head pressurizing line to said pump inlet.

2. The ink jet printer of claim 1 further comprising:

print head return line for providing a flow of ink from said reservoir to said source;

second valve means for selectively opening or closing said print head return line; and said control means includes means for sensing ink pressure in said reservoir and for actuating said second valve means to close said print head return line at said predetermined pressure, thereby generating a shock wave through ink in said reservoir such that ink is forced through said orifice.

3. The ink jet printer of claim 2 wherein said sensing means comprises a capacitive transducer located on said print head return line adjacent said reservoir and upstream of said second valve means.

4. The ink jet printer of claim 3 wherein said transducer includes a plate-shaped sensing surface, and said print head return line includes a section attached to said surface, which corresponds in size therewith and is shaped such that the cross-sectional area of said section across said surface is constant, and equals a cross-sectional area of the remainder of said print head return line.

5. The ink jet printer of claim 4 wherein said pump means is a constant volume pump.

6. The ink jet printer of claim 5 wherein print head supply means comprises:

a print head supply line for conveying ink from said pump outlet to said reservoir;

a recirculating line for conveying ink from said print head supply line to said pump inlet; and third controllable valve means for diverting ink from said pump outlet to said reservoir or said pump inlet.

7. The ink jet printer of claim 6 further comprising:

vacuum pump means having an inlet, and an outlet communicating with the atmosphere;

tank vacuum line for conveying air from said supply tank to said vacuum pump outlet such that a subatmospheric pressure may be created in said supply tank;

first air supply line for conveying atmospheric air to said vacuum pump inlet, and including first controllable air valve thereon for selectively opening and closing air flow therethrough;

second air supply line for conveying atmospheric air to said vacuum pump inlet, and including second controllable air valve thereon for selectively opening and closing air flow therethrough;

print head purge line for conveying atmospheric air from said first and second air supply lines upstream of said air valves to said print head supply line, and including third controllable air valve thereon for selectively opening and closing air flow therethrough; and said control means includes means for selectively actuating said air valves whereby said third air valve is opened to purge said reservoir with air drawn to said supply tank, and said first and second air valves may be opened or closed to vary the vacuum in said supply tank.

8. The ink jet printer of claim 7 wherein said vacuum pump is a constant volume pump.

9. The ink jet printer of claim 8 wherein said print head purge line includes check valve means thereon to check flow away from said print head supply means; and said third air valve includes means communicating with said pump inlet whereby said third valve may be actuated so that said vacuum pump lowers air pressure in said purge line and thereby closes said check valve.

10. The ink jet printer of claim 9 further comprising flow restriction means on said ink supply means between said third valve means and said reservoir.

11. An ink jet printer, comprising:

a print head having a fluid receiving reservoir and an orifice plate with at least one orifice communicating with said reservoir for providing ink flow therethrough to form a jet drop stream;

an ink supply tank for storing a quantity of ink;

ink pump means having an inlet for receiving ink from said supply tank and an outlet for delivering ink under pressure;

print head supply line for providing a flow of ink from said pump outlet to said reservoir;

first ink recirculating line for providing a flow of ink from said pump outlet to said supply tank;

second ink recirculating line for providing a flow of ink from said pump outlet to said pump inlet;

first controllable valve means for selectively directing ink flow from said pump outlet through either said first or said second ink recirculating lines;

flow restriction means located on said first ink recirculating line;

accumulator means located on said first ink recirculating line between said flow restriction means and said pump outlet for receiving ink from said pump outlet, thereby creating a back pressure in said first ink recirculating line upstream of said restriction means and in said print head supply line which increases with time; and means for controllably actuating said first controllable valve means to direct ink from said pump outlet through said second ink recirculating line, whereby ink pressure in said reservoir and said print head supply line remains substantially constant, or to direct ink from said pump outlet through said first ink recirculating line, whereby said flow restriction means and said accumulator means causes ink pressure in said reservoir and said print head supply line to increase with time.

12. The ink jet printer of claim 11 further comprising:

an ink return line for providing a flow of ink from said reservoir to said supply tank;

means for sensing ink pressure within said reservoir;

second controllable valve means for selectively opening or closing said ink return line; and said actuating means includes means for actuating said second valve means to close said ink return line when said sensing means senses a predetermined pressure in said reservoir.

13. The ink jet printer of claim 12 further comprising:

third ink recirculating line for providing a flow of ink from said print head supply line to said pump inlet; and third controllable valve means for selectively directing a flow of ink from said pump outlet through either said print head supply line, whereby ink is supplied to said reservoir, or through said third recirculating line whereby ink is not supplied to said reservoir.

14. In an ink jet printer of the type having an ink supply tank, a print head including a reservoir and an orifice plate communicating with said reservoir, a print head supply line including pump means thereon for delivering ink under pressure from said supply tank to said reservoir, and an ink return line for conveying ink from said reservoir to said supply tank and including valve means thereon for opening or closing ink flow along said ink return line, the improvement comprising:

vacuum pump means having an inlet and an outlet communicating with the atmosphere;

a tank vacuum line for conveying air from said supply tank to said vacuum pump outlet such that operation of said vacuum pump means reduces pressure within said tank below atmospheric;

a first air supply line for conveying atmospheric air to said vacuum pump inlet, and including first controllable air valve thereon for selectively opening and closing air flow therethrough;

a second air supply line for conveying atmospheric air to said vacuum pump inlet, and including second controllable air valve thereon for selectively opening and closing air flow therethrough;

a print head purge line for conveying atmospheric air from said first and second air supply lines upstream of said air valves to said print head supply line, and including third controllable air valve thereon for selectively opening and closing air flow therethrough; and control means for selectively actuating said air valves whereby said third air valve is opened so that atmospheric air from said first and second air supply lines is drawn through said reservoir to said supply tank to purge ink from said reservoir, and said first and second air valves each may be opened or closed to vary the subatmospheric pressure in said supply tank.

15. The ink jet printer of claim 14 further comprising:

exhaust valve communicating with said pump outlet for opening and closing air flow therefrom to the atmosphere;

said print head including air skirt means; and an air skirt line for conveying air from said pump outlet upstream from said exhaust valve to said air skirt.

16. A method of supplying ink to the print head of a printer for producing a plurality of jet drop streams emanating therefrom, said printer having a source of ink, an ink supply line connected to said print head and having a supply valve thereon for opening and closing said supply line, a pump with an inlet for receiving fluid from said source and an outlet connected to said ink supply line, and an ink return line for conveying ink from said print head to said source and including outlet valve means thereon for opening and closing ink flow therethrough, comprising the steps of:

opening said supply valve to initiate ink flow from said pump through said supply line to said print head;

connecting a first ink recirculation line, including a fixed restriction thereon and accumulator means upstream thereof, between said pump outlet and said source, thereby rapidly increasing ink pressure in said first recirculation line, said ink supply line, and said print head;

closing said outlet valve when ink within said print head reaches a predetermined pressure thereby sending a pressure wave through said print head to initiate jet drop streams therefrom; and disconnecting said first ink recirculation line from said pump outlet.

17. The method of claim 16 wherein said outlet valve closing step includes an initial step of sensing ink pressure within said print head.

18. The method of claim 17 wherein said connecting step includes the step of simultaneously disconnecting a second ink recirculating line between said pump outlet and said pump inlet.

19. The method of claim 18 wherein said supply valve opening step includes the step of disconnecting a third recirculation line between said supply valve to said pump inlet.

20. The method of claim 19 further comprising the initial step of removing ink from said print head by connecting a first air supply line from the atmosphere to said ink supply line and generating a subatmospheric pressure in said source, thereby forcing ink from said print head to said source.

21. The method of claim 20 wherein said ink removal step includes a subsequent step of connecting a clean air skirt line from an outlet of an air pump to an air skirt about charge plates of said print head.

22. The method of claim 21 wherein said first ink recirculation line connecting step includes the step of simultaneously decreasing pressure within said source and connecting a catcher line between catchers adjacent said print head and said source.

23. A method of supplying ink to the print head of a printer for producing a plurality of jet drop streams emanating from an orifice plate thereof, said printer having a source of ink, an ink supply line connected to said print head, an ink pump with an inlet for receiving fluid from said source and an outlet connected to said ink supply line, an ink return line for conveying ink from said print head to said source and including outlet valve means thereon for opening and closing ink flow therethrough, a vacuum line extending from said source, a vacuum pump having an inlet connected to said source and to a first pump supply line to convey atmospheric air to said vacuum pump inlet, said vacuum pump having an outlet communicating with the atmosphere, and catcher means for catching deflected ink drops, said catcher means communicating with said source, comprising the steps of:

disconnecting said first pump supply line, thereby reducing pressure in said source below atmospheric pressure;

connecting a first air supply line to convey air at atmospheric pressure to said ink supply line such that air passes from said air supply line, through said ink supply line, said print head, said ink return line, and to said source, thereby removing ink from said print head;

disconnecting said first air supply line;

introducing ink into said ink supply line to flow through said print head and through said return line to said source at a pressure below that sufficient to create drop streams from said print head;

simultaneously connecting said first pump supply line and a second pump supply line to convey atmospheric air to said vacuum pump inlet, thereby increasing pressure within said source to control ink flow through said print head, and connecting said ink supply line to said ink pump outlet to supply ink to said print head;

disconnecting said first pump supply line, thereby decreasing pressure within said source, and simultaneously increasing ink pressure in said ink supply line and print head to a pressure sufficient to create drop streams from said print head;

closing said outlet valve means, thereby creating a pressure wave in said print head to initiate ink jet drops therefrom; and connecting said first pump supply line, thereby decreasing pressure within said source and at said catchers.

24. The method of claim 23 further comprising a down sequence comprising the steps of:

disconnecting said first pump supply line, thereby decreasing pressure in said source;

opening said outlet valve means, thereby reducing ink pressure in said print head below that for producing jet drop streams;

connecting said first pump supply line; and simultaneously disconnecting said second pump supply line, connecting said air supply line, and disconnecting said ink supply line from said ink pump, thereby purging said print head of ink.

* * * * *

UNITED STATES PATENT AND TRADEMARK OFFICE

CERTIFICATE OF CORRECTION

PATENT NO. : 4,494,124

DATED : January 15, 1985

INVENTOR(S) : Michael J. Piatt & Theodore F. Williams

It is certified that error appears in the above-identified patent and that said Letters Patent is hereby corrected as shown below:

In The Abstract, line 18, "thereof" should be --thereon--.

Column 1, lines 66 and 67, "recirculating" should be --recirculated--.

Column 2, line 36, "detemination" should be --determination--.

Column 5, line 1, "heat" should be --head--.

Column 11, line 58, "causes" should be --cause--.

Column 13, line 21, "recirculating" should be --recirculation--.

Signed and Sealed this

*Fourteenth* Day of *May 1985*

[SEAL]

*Attest:*

DONALD J. QUIGG

*Attesting Officer* *Acting Commissioner of Patents and Trademarks*